United States Patent [19]
Chang

[11] Patent Number: 5,542,757
[45] Date of Patent: Aug. 6, 1996

[54] FRONT PANEL ASSEMBLY OF A DISKDRIVE CASE

[76] Inventor: Chia-Chi Chang, No. 3, Min-Ho Lane, Min Sheng Li, Yuan-Lin Town, Chang-Hua Hsien, Taiwan

[21] Appl. No.: 545,307

[22] Filed: Oct. 19, 1995

[51] Int. Cl.⁶ .............................. A47B 81/00; H05K 5/00; H05K 7/20
[52] U.S. Cl. ..................... 312/223.2; 312/257.1; 312/293.3; 312/213; 312/236; 454/184; 361/687; 361/724
[58] Field of Search ................................. 312/236, 223.2, 312/265.6, 222, 293.1, 293.3, 213, 242, 257.1; 454/184; 361/687, 676, 688, 690, 692–695, 683, 685, 644, 724–727

[56] References Cited

U.S. PATENT DOCUMENTS

| | | | |
|---|---|---|---|
| 4,702,154 | 10/1987 | Dodson | 454/184 |
| 4,725,244 | 2/1988 | Chewning et al. | 361/726 X |
| 4,728,160 | 3/1988 | Mondor et al. | 312/236 |
| 5,006,959 | 4/1991 | Freige et al. | 361/687 |
| 5,119,270 | 6/1992 | Bolton et al. | 361/687 |
| 5,164,886 | 11/1992 | Chang | 312/257.1 X |
| 5,169,218 | 12/1992 | Chu | 312/223.2 |
| 5,199,776 | 4/1993 | Lin | 312/293.3 |
| 5,264,986 | 11/1993 | Ohgami et al. | 361/685 |
| 5,297,004 | 3/1994 | Mazura | 361/690 |
| 5,392,192 | 2/1995 | Dunn et al. | 361/727 X |
| 5,397,176 | 3/1995 | Allen et al. | 312/265.6 X |
| 5,491,611 | 2/1996 | Stewart et al. | 312/223.2 X |

FOREIGN PATENT DOCUMENTS 2262388  6/1993  United Kingdom .................. 361/724

Primary Examiner—Peter M. Cuomo
Assistant Examiner—James O. Hansen
Attorney, Agent, or Firm—Merchant, Gould, Smith, Edell, Welter & Schmidt, P.A.

[57] ABSTRACT

The front panel assembly of a diskdrive case, including a panel frame having a rectangular panel board slot, a control button slot, and two vertical retaining grooves disposed in the rectangular panel board slot at two opposite sides, two rectangular panel boards mounted in the panel board slot and separated by a partition board, and at least one control button mounted in the control button slot for controlling the operation of a respective diskdrive, the rectangular panel boards and the partition board each having hooks at two opposite ends respectively hooked on the retaining grooves of the panel frame and a plurality of air vents for dissipation of heat.

1 Claim, 4 Drawing Sheets

FRONT PANEL ASSEMBLY OF A DISKDRIVE CASE

BACKGROUND OF THE INVENTION

The present invention relates to diskdrive cases, and relates more particularly to the front panel assembly of a diskdrive case which has panel boards with air vents for dissipation of heat.

Regular diskdrive cases are commonly made for carrying two diskdrives at different elevations, having two control buttons at the front side for controlling the operation of a respective diskdrive. Because two diskdrives are mounted inside the diskdrive case and arranged in a stack, heat cannot be effectively dissipated.

SUMMARY OF THE INVENTION

The present invention has been accomplished to provide a front panel assembly for a diskdrive case which has air vent means for dissipation of heat. According to the preferred embodiment of the present invention, the front panel assembly comprises a panel frame having a rectangular panel board slot, a control button slot, and two vertical retaining grooves disposed in the rectangular panel board slot at two opposite sides, two rectangular panel boards mounted in the panel board slot and separated by a partition board, and at least one control button mounted in the control button slot for controlling the operation of a respective diskdrive, the rectangular panel boards and the partition board each having hooks at two opposite ends respectively hooked on the retaining grooves of the panel frame and a plurality of air vents for dissipation of heat.

DETAILED DESCRIPTION OF THE PREFERRED EMBODIMENT

A diskdrive case in accordance with the present invention is for holding at least one diskdrive for connection to a computer system on the outside.

Figure 1:
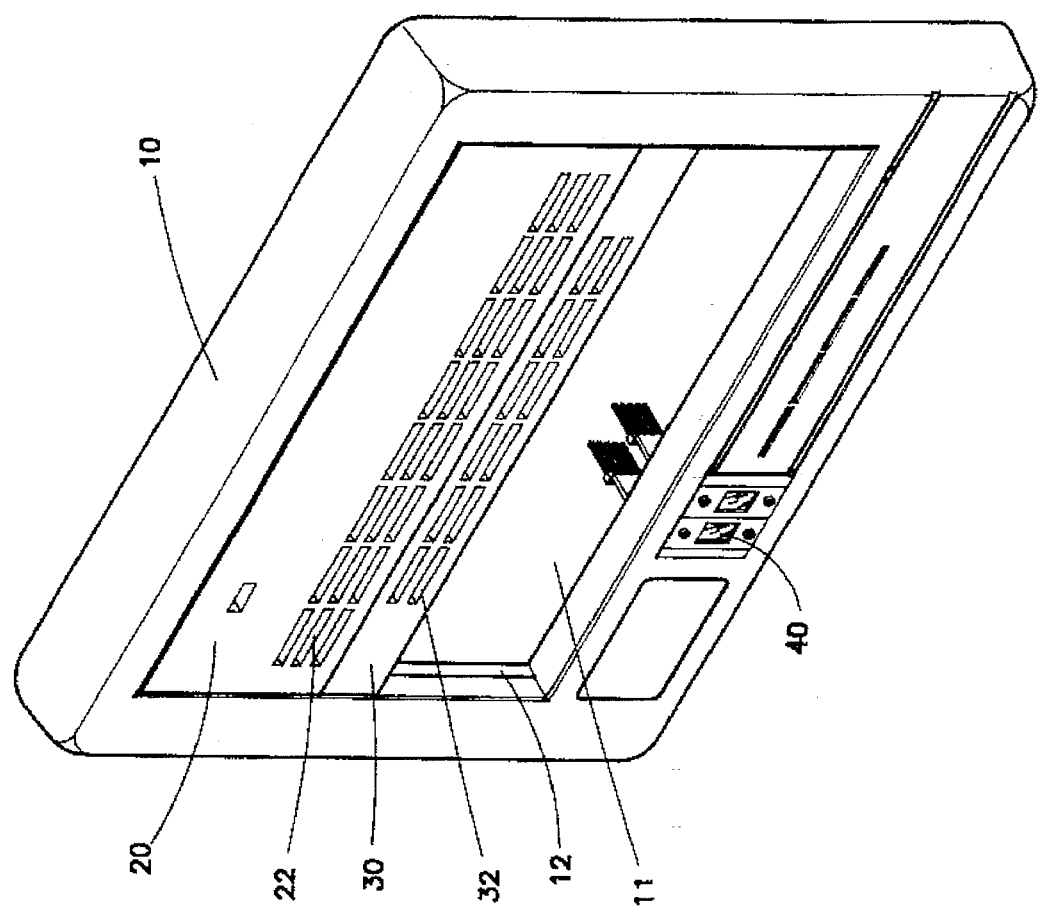
FIG. 1 is an elevational view of the front panel assembly of a diskdrive case according to the present invention.
Figure 2:
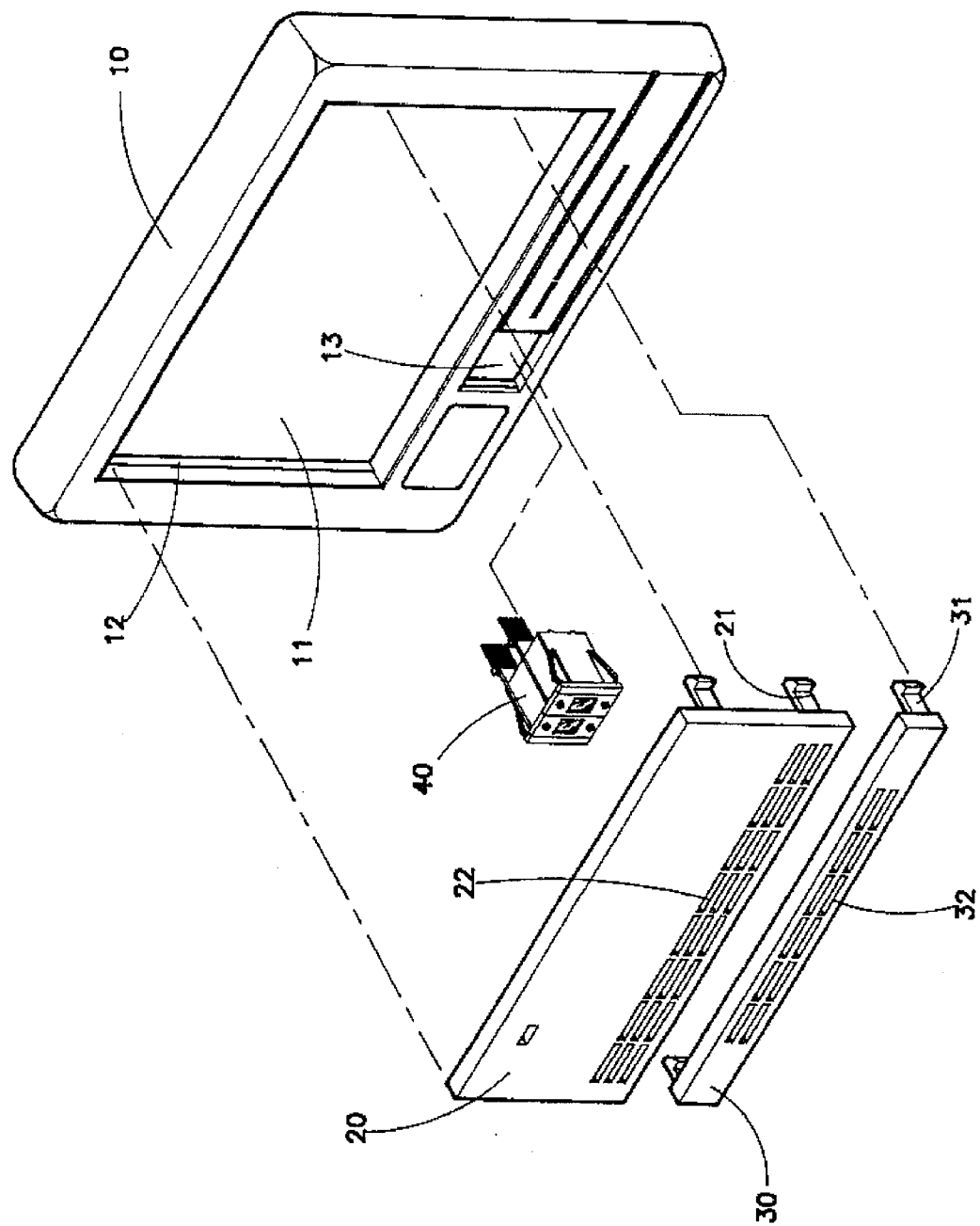
FIG. 2 is an exploded view of the front panel assembly shown in FIG. 1.
Figure 3:
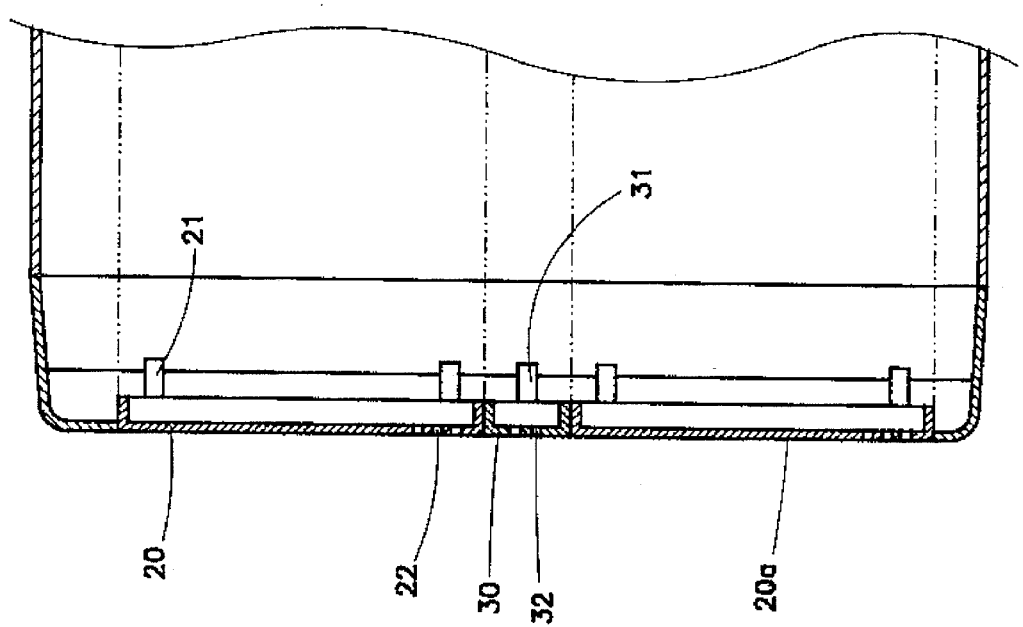
FIG. 3 is a side view in section of the front panel assembly shown in FIG. 1.

Referring to FIGS. 1, 2, and 3, the front panel assembly of the diskdrive case of the present invention comprises a panel frame 10 having a rectangular panel board slot 11 and a control button slot 13. Two vertical retaining grooves 12 are made within the rectangular panel board slot 11 at two opposite sides. Two rectangular panel boards 20 and 20a and a rectangular partition board 30 are respectively mounted in the rectangular panel board slot 11. Each of the panel boards 20 and 20a has two pairs of hooks 21 at two opposite ends respectively hooked on the two vertical retaining grooves 12, and a plurality of air vents 22 for dissipation of heat. The partition board 30 is mounted in the rectangular panel board slot 11 and stopped between the panel boards 20 and 20a, having one pair of hooks 31 at two opposite ends respectively hooked on the two vertical retaining grooves 12, and a plurality of air vents 32 for dissipation of heat. Two diskdrive control buttons 40 are installed in the control button slot 13 of the panel frame 10 for controlling a respective diskdrive.

Figure 4:
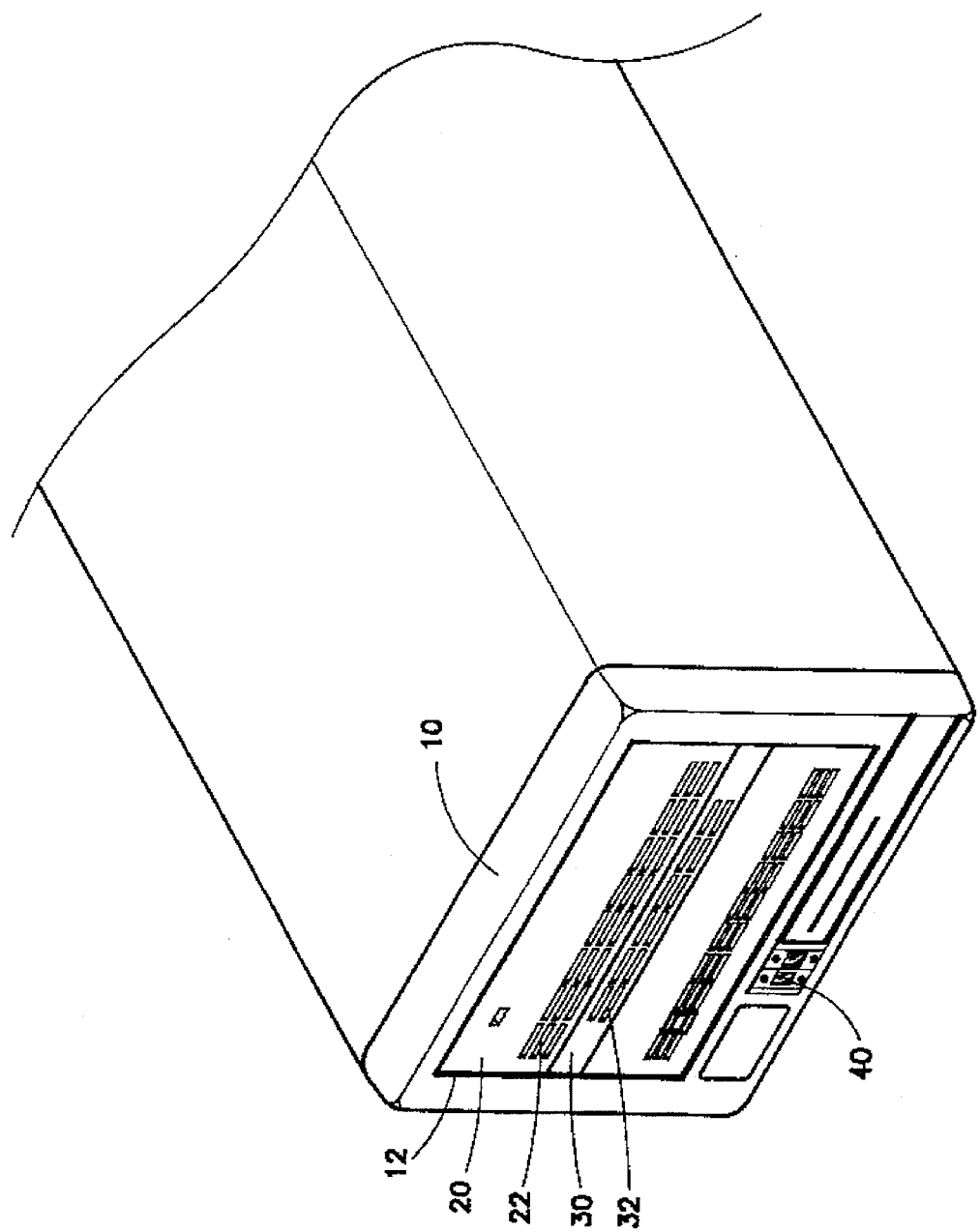
FIG. 4 is an elevational view showing the front panel assembly installed in the diskdrive case according to the present invention.

Referring to FIG. 4, the panel boards 20 and 20a are separated by the partition board 30; the panel boards 20 and 20a and the partition board 30 have respective air vents 22 and 32 for dissipation of heat. When one diskdrive is installed in the diskdrive case, the respective panel board 20 or 20a is removed. If two diskdrives are installed, the two panel boards 20 and 20a are removed.

It is to be understood that the drawings are designed for purposes of illustration only, and are not intended as a definition of the limits and scope of the invention disclosed.

I claim:

1. A front panel assembly for diskdrive cases, comprising a panel frame having a rectangular panel board slot, a control button slot, and two vertical retaining grooves disposed in said rectangular panel board slot at two opposite sides, two rectangular panel boards and a rectangular partition board respectively mounted in said panel board slot, each rectangular panel board having at least one pair of hooks at two opposite ends respectively hooked on said vertical retaining grooves and a plurality of air vents for dissipation of heat, said partition board being connected between said panel boards and having one pair of hooks at two opposite ends respectively hooked on said vertical retaining grooves and a plurality of air vents for dissipation of heat, and at least one diskdrive control button respectively mounted in said control button slot for controlling the operation of a respective diskdrive.

* * * * *